Sept. 14, 1948.   C. R. STEVENS   2,449,256
EXTERNAL ANODE POWER AMPLIFIER
AND OSCILLATOR TUBE
Filed Nov. 4, 1946
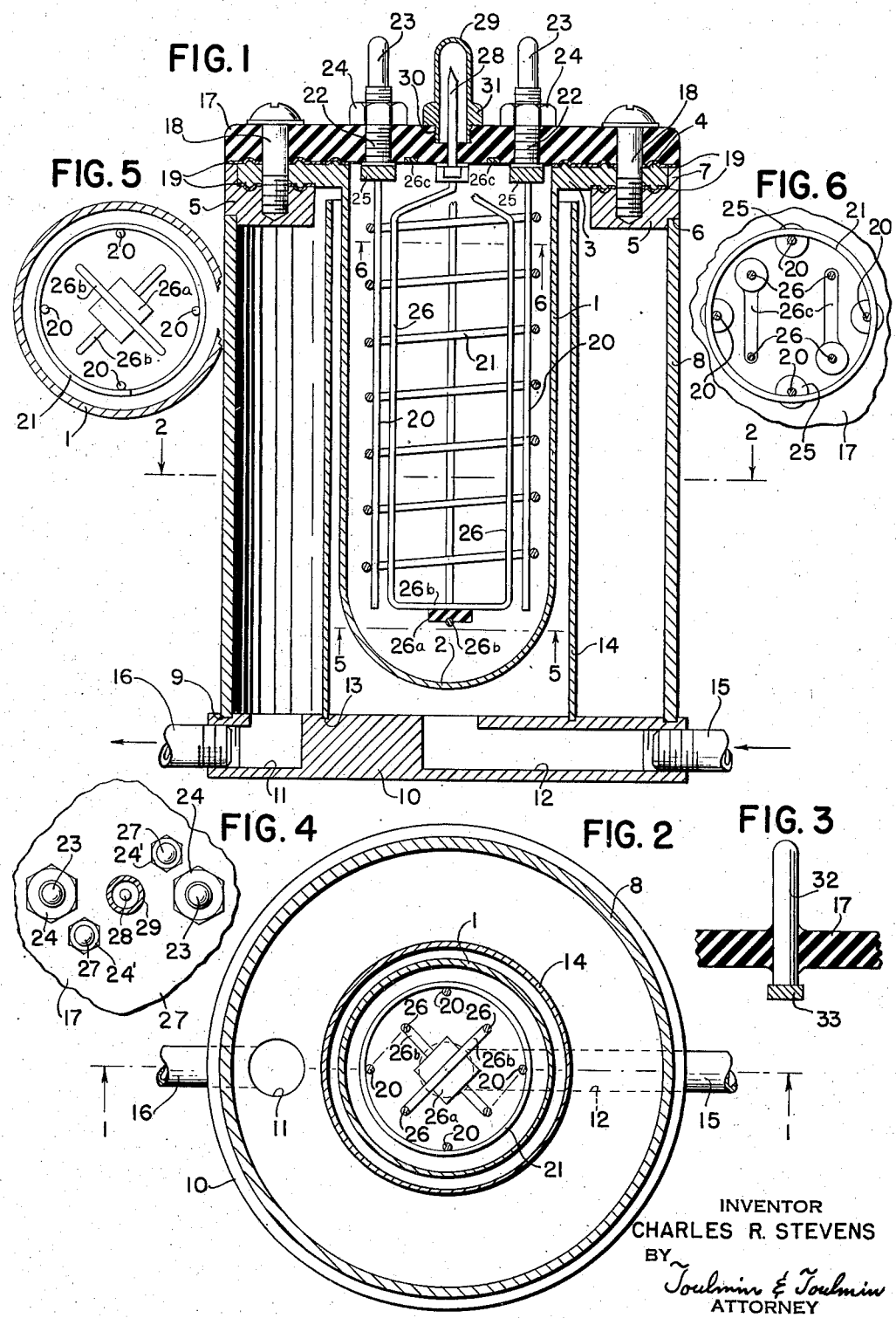
INVENTOR
CHARLES R. STEVENS
BY
Toulmin & Toulmin
ATTORNEY Patented Sept. 14, 1948

2,449,256

UNITED STATES PATENT OFFICE 2,449,256

EXTERNAL ANODE POWER AMPLIFIER AND OSCILLATOR TUBE

Charles R. Stevens, Toledo, Ohio, assignor, by mesne assignments, to Glass Fibers, Inc., Waterville, Ohio Application November 4, 1946, Serial No. 707,701

10 Claims. (Cl. 250—27.5)

The present invention relates to electric discharge devices and more especially to tubes of the thermionic type employed for translating large amounts of power.

The manufacture of tubes, particularly those of the large power type, has in the past been considered a very complicated job. The interior must necessarily be evacuated and this operation introduces considerable difficulty, particularly in the case of an all metal tube. My invention is based on a somewhat different principle from that heretofore employed in the tube art in that I employ relatively low voltage between the various electrodes but the output of the tube is still maintained up to the desired value by designing the tube to carry the requisite currents at the selected voltage. This may necessitate larger areas of filament, grid and anode, and in other words, I deliberately design a greater size tube than is normally considered necessary to translate the power required at standard loads but instead my tube translates at lower voltages with greater current values so that the power remains the same as in the more standard forms of thermionic tubes. This lower voltage high current tube offers many advantages over tubes on the present market in that electrical leakages, capacities and other disturbing electrical variants are kept at a minimum due to the low voltage, yet sufficient translation area at the electrode surfaces is always available to constitute a highly efficient operating tube. Obviously, this wide flexibility and size of the various electrodes and parts, as well as the adaptation to large area and low voltages, greatly extends the design limitations of tubes which heretofore have been designed on the basis of producing the smallest physical size tube using the smallest electrode by operating at the highest voltage possible in order to keep the current as low as possible.

In the manufacture of metal tubes of the ordinary type, the joints between the exterior parts are usually welded together or otherwise made vacuum tight and, in addition, it has been customary to form a glass-to-metal seal about the various leading-in conductors in order to insure freedom from air leakage. All of these provisions necessitate integral connections or seals between the parts of the envelope, including the leading-in conductors. These glass metal seals are characteristically small in physical size as well as sealing area and are therefore mechanically weak because of the nature of the materials sealed together and the small surface presented to the seal. Moreover, all of the connections referred to hereinbefore are obviously expensive since they involve a flawless welding operation and positively preclude any taking apart of the envelope in order to reach the electrodes for replacement or inspection.

The prior tubes were invariably designed on the basis of removing the last trace of deleterious gases, including the atmosphere so that tubes of this character can, if desired, be employed for translating electric power at extremely high voltages. Indeed, the art has, in general, progressed to the point of denuding all of the elements of gas to make sure that not the slightest trace of such gas is present within the tube under heated operating conditions. All of these processes tend to make a tube very expensive in construction, require considerable highly skilled labor to effect the various processes and when the tube is finally completed, no access can be accorded to the interior of the tube because the various gas-denuding and other treatments would have to be repeated.

In accordance with the principles of my invention, I have found that this high degree of vacuum, i. e., before the inert gas is introduced in the case of a gas tube, is unnecessary, particularly when translating at lower voltages. I may use a rough vacuum without initiating an uncontrolled glow or arc discharge by reason of these lower voltages and yet the power output of the tube is not sacrificed because the tube internal resistance or impedance is kept relatively low. In one aspect of my invention, I contemplate the use of an electrode structure including a cathode, grid and anode in which these elements are of relatively high conductivity and spaced reasonably close together so that the tube can handle large amounts of current at voltages substantially less than those employed in the standard highly evacuated gas filled tubes, in which case, my improved tube does not require the expensive techniques of metal treatment and obtaining a high vacuum. As a matter of fact, I have found that even when the anode metal is heated in order to denude the same of the gas content that does not necessarily guarantee the complete absence from deleterious gas or gases within the interior of the anode. Even in the case of the high drawn copper or steel certain voids appear between the elements of the anode metal which permit the gradual seepage through the anode material of the atmosphere over a period of time. However, as it will be explained hereinafter any gas that either finds its way into the anode or is given off by the anode during operation in no wise affects the successful use of my improved tube. In order to increase the power output in terms of current but while minimizing the gases driven off from the anode during operation, the improved tube can be maintained at a relatively low temperature by a water jacket surrounding the tube.

The primary object of the invention is to provide an improved thermionic device of an inexpensive character, made of parts of ordinary shape and composition and put together in such a manner that the device can be readily taken apart for replacement and inspection of parts.

Another object is to provide a tube, made for the most part of metal and, therefore, of extremely rugged character without requiring any permanently fixed joints within the tube structure so that the parts can be readily made, readily assembled and also readily disassembled. My improved tube also does not require the use of soft material between the various sealing supports as for example the use of sponge rubber, sometimes used between a centrally positioned electrode and surrounding envelope.

Another object is to provide a substantially all metal tube, in which the parts can be easily machined to size and shape so that these parts are essentially of inexpensive character and require only ordinary machine elements for securing them together.

The invention will be better understood when reference is made to the following description and the accompanying drawings, in which:

Figure 1 represents a vertical sectional view of the improved tube and

Figure 2 is a transverse section taken along line 2—2 in Figure 1.

Figure 3 represents a small fragmentary view of a modified structure for carrying the contact pins through the upper cover of the tube; while Figure 4 is a fragmentary plan view showing the arrangement of the contact pins and the evacuating conduit of the tube shown in Fig. 1.

Figure 5 is a fragmentary plan view taken at the line 5—5 in Figure 1 and showing the crisscross arrangement of the upper filament supports; while Figure 6 is a view taken along line 6—6 showing the connections between the filament legs at the bottom.

Referring to Figures 1 and 2, reference character 1 designates a cylindrical anode made of fairly heavy metal and closed at the bottom by a hemispherical portion 2. The upper part of the anode is supported from an integral radially extending flange 3 of much greater thickness than the thickness of the anode. The upper and lower surfaces of the flange 3 are provided preferably with a plurality of concentrically arranged corrugations 4, the purpose of which will be explained hereinafter. The flange rests on a ring member 5 having a shoulder at 6 and provided with an upwardly extending lip 7. The ring is also provided with recesses corresponding to the corrugations 4. The shoulder on the ring member 5 fits over a cylindrical casing 8 which is of approximately the same diameter as the ring member 5. The metal casing 8 fits into a circular groove 9 cut in the upper face of a circular plate 10 having considerable thickness. This plate is provided with a pair of inwardly extending passageways 11, 12, the passageway 11 opening into the space within the casing 8 and the passageway 12 opening into a position at the center of the plate.

There is an inner circular groove 13 in the plate 10, this groove providing a support for an upstanding metal cylinder 14 which has an internal diameter only slightly larger than the external diameter of the anode 1. Pipes 15 and 16 are threaded into the respective passageways 12 and 11 for the purpose of admitting water or other cooling fluid into the passageway 12 under pressure and causing the fluid to pass upwardly between the anode and the cylinder 14, over the edge of the cylinder and thence through the space between the inner cylinder 14 and the outer cylinder 8 to the passageway 11 and pipe 16. Due to the thinness of the layer of water or other fluid contacting the outer surface of the anode and constrained to this position by the partition 14, the water exercises a quick cooling effect on account of its increased velocity in passing upwardly along the anode.

A cover 17 extends over the flange 3 and is secured in position by a plurality of round headed screws 18 which thread into openings provided in the ring 5. Circular grooves are provided on the underside of the cover to receive the corrugations on the upper side of the ring member. The cover may be constituted of hard rubber but preferably of a material sold under the name of "Mycalex" or a phenolic condensation product such as Bakelite and in which the various holes for the screws 18 and for the contact pins described hereinafter can be molded in place. If desired, thin gaskets 19 of soft metal, such as lead, copper or zinc, may be interposed between the flange portions 3 of the anode and each of the cover 17 and the ring 5 so that when the screws 18 are tightened a substantially perfect fluid-tight seal is obtained at the position of the corrugations on the upper and lower surfaces of the flange 3.

Within the anode 1 there is an electrostatic control member or grid 20 formed of a plurality of vertical stay rods (four as shown) of relatively large diameter which serve as a support for convolutions of heavy wire 21 wound therearound. These wires can be welded or otherwise secured to the stay rods. The grid is characterized by being a very heavy and large member capable of receiving considerable control current. In order to reduce the potential drop as much as possible at the grid leading-in conductors, a pair of such conductors are provided which incidentally serve as a stabilized support of the grid. For this purpose the stay rods are secured to a pair of oppositely disposed cap screws 22 which fit snugly in openings in the cover 17 and terminate in a smooth contact pin portion 23 having a hemispherical end. Inasmuch as the cap screws 22 do not rotate but are held in position by nuts 24, the stay rods 20 can be welded or otherwise directly secured to the caps 25 of the screws. If desired, thin washers of soft metal may be interposed between the cap portions 25 and the undersurface of the cover member in order that when the nuts 24 are securely tightened a substantially hermetic seal is effected between these cap portions and the cover.

There is a cathode 26, preferably formed of a pair of U-shaped rods positioned at right-angles to one another, the two legs of each rod being connected in series, and positioned symmetrically within the grid convolutions 21. These rods may be constituted of any of the usual filament or cathode metals such as tungsten or any inexpensive metal such as nickel and iron. If desired, the cathode can be coated with an electron-emitting oxide as is well-known in the art or may be indirectly heated although, in general, I prefer to use bare metal for the series connected legs or other cathode for reasons which will be apparent in discussing the operation of the device.

The U-shaped rods 26 may be insulatingly supported from one another within the grid in any suitable manner, and as shown in Figure 5, one of the U-shaped rods at the bottom carries an insulator 26a which serves as a support for the short transverse extending member of the other U-shaped rod pair of the cathode indicated at 26b. The two sets of U-shaped rods forming the complete cathode can be joined respectively in series through conductors 26c embedded in the cover member 17, the method of connection being clearly shown in Figure 6.

In order to support the cathode in position the legs of the U-shaped rods may be secured to cap screws similar to those indicated at 22, which screws are secured in a hermetic fit by a pair of nuts 24'. The two contact pins 27 of the cathode are preferably positioned symmetrically to the contact pins 23 of the grid as indicated in Figure 4 so that the maximum electrical creeping distance along the cover 17 can be maintained.

In order to evacuate the tube, there may be provided through the cover a pipe 28 preferably positioned at the center of the cover, as indicated in Figure 4, and extending from a position within the interior of the anode to an extended position beyond the cover. This pipe may be threaded, if desired, into the cover plate although, in general, it is sufficient to have a snug fit as leakage is prevented by a thimble-like shield 29 which extends over and around the pipe and may, if desired, be threaded into the cover, as indicated at 30. A hexagon head 31 may, if desired, be provided at the lower end of the thimble in order to tighten the latter securely into the cover and thereby effect a good air-tight seal about the pipe 28. It is obvious that this pipe may be connected to a rough vacuum pump and when all of the air has been removed down to the evacuating suction of the pump, inert gas such as nitrogen, argon or helium may be introduced in the well-known manner. The presence of the gas is not for the purpose of effecting a glow or arc discharge but simply to assist in the formation of positive ions between the cathode and anode and thereby carry greater amounts of current. Thus, the optimum pressure of the gas depends on the voltages applied to the grid and anode and should be such as to discourage the initiation of an uncontrolled glow or arc discharge at the requisite voltages between the cathode and anode. However, it will be understood that many of the tube constructional features disclosed herein can be used in positive ion cumulative glow and arc discharge devices, particularly since the joints between the parts of the envelope and the cover are practically air and gas tight.

Instead of utilizing a wholly inert gas within the thermionic device, I may employ a rarified atmosphere, leaving enough nitrogen within the envelope to facilitate the passage of large amounts of current but not enough oxygen as to deleteriously oxidize any of the active surfaces of the electrodes.

After the evacuating process has proceeded to the necessary degree and, if desired, an inert gas admitted to the proper pressure as explained above, the tube 28 can be sealed off from the pump by a blow-torch in a manner similar to that used in connection with metal radio tubes. The thimble 29 is then immediately placed in position about the tube 28 in order to protect the sealing off point and in addition to maintain a hermetic seal about the evacuating tube.

It is apparent that in case a rarified atmosphere is employed within the tube, the metals out of which the cathode, grid and anode are made should be such as to resist oxidization to a large extent. In case an oxide coating is applied to the cathode surface, the presence of the oxygen within the rarified atmosphere would be beneficial in promoting the production of electrons and the resulting positive ions. However, it will be understood that in the case of an active coating applied to the cathode, the pressure of the gas is preferably such that there is no cumulative ionization which might result in a glow or arc discharge and, therefore, no deleterious bombardment of the cathode surface by positive ions. The grid maintains its electrostatic control function throughout any part or the entire half cycle of anode voltage in case the device is used as a rectifier or as an oscillation generator or converter and in this respect the anode functions no differently from that found in the highest evacuated type of tube except that gas is used in such quantity merely to provide a reasonable amount of positive ionization but below the glow or arc discharge intensity.

The device is characterized by elements of extremely large size, for example, the filament may constitute a rod as heavy as a one-quarter inch diameter and the convolutions of the grid having a similar size so that the power input to both the filament and also into the cathode-grid circuit might be enormous. These huge amounts of power can be handled readily by the tube, notwithstanding its relatively small size because the anode is maintained at a reasonably low temperature by the circulating cooling fluid and more especially by the fast moving film-like stream which passes upwardly immediately adjacent the outer anode surface.

Another characteristic of the tube as described is the fact that all of the electrodes including the anode, grid and cathode can be readily removed from the water jacket and from one another by simply unscrewing the elements 18 and the nuts 24 which permits the cover 17 to be removed. All of the parts including the electrode structure and the element for supporting this structure from the cover can be readily and inexpensively made on machines, in quantity production and constituted of the most inexpensive metals and elements. None of the elements need be subjected to the expensive air-denuding and heat treatments, in fact, the electrodes and all parts can be used as they are manufactured by ordinary metal-working machines. The relatively low voltages applied to the electrodes precludes any deleterious effects and yet, large amounts of power can be efficiently translated. It is obviously a simple matter to replace any of the elements quickly, assuming, of course, that a rough vacuum pump is available to re-evacuate the interior of the anode. It will be further noted that if it is desired merely to detach the electrode structure as a whole from the water jacket, this can be done by simply removing the screws 18.

Instead of providing cap bolts for supporting the grid and cathode elements from the cover, I may mold the contact pins into the cover 17, particularly when the latter is made of "Mycalex," as is indicated in Figure 3. A sufficiently hermetic joint can be obtained in this manner, particularly if the metal content of the pins 32 is not considerable as when made out of hollow tubing rounded off at one end. These pins in the case of the grid electrode carry a metal ring between them, indicated at 33 (Fig. 3), to which the opposite stay wires of the grid could be welded or otherwise secured. The contact pins for the cathode are electrically separated from one another and for that reason may each be provided with a round metal disc (not shown) welded or soldered to the lower edge of each contact pin. The upper legs of the cathode rod are each secured as by welding to these discs.

It is apparent that, if desired, the evacuating pipe 28 may also be molded in the cover 17 and the shield 29 placed about the tubing in the manner described in connection with Figure 1 or in any other suitable way.

While I have explained the structure of my improved tube as using corrugated surfaces on both sides of the anode flange 3, it will be understood that depending on the amount of pressure that can be applied to the bolts 18 the cover 17 can be made hermetically tight with respect to the flange even in the absence of these corrugations. Moreover, depending on the degree of facility with which it may be desired to take the elements of the tube apart, I may weld or otherwise permanently fix the anode flange 3 to the jacket ring 5. When the cover 17 is constituted of "Mycalex," a bonded seal between the cover and the upper surface of the flange 3 can be obtained by applying heat in a well-known manner, in which case, it may be desirable simply to make the water jacket removable from the anode cylinder 3 by depending on the bolts 18 to effect a comparatively good seal at the upper surface of the ring 5. Thus, any degree of removability of the various parts within the anode and also the parts of the water jacket can be effected in any desired degree depending on whether or not the various joints on the upper and lower surface of the anode flange 3 are of a permanent or a detachable character.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent is:

1. A relatively low voltage, low vacuum thermionic device comprising a hollow anode closed at one end and having an outwardly extending metal flange of substantial thickness at the other end, said flange having corrugations on one side, a cover resting on said corrugations closing the open end of the anode, said cover having recesses receiving the corrugations of the flange, screw means passing through said cover and entering the anode flange detachably securing the cover to said flange in order to provide a fluid tight seal at the corrugations, an electrostatic control member and a cathode within said anode, combined support and leading-in conductors for said control member and cathode, and detachable means securing said support-conductors to said cover in order to effect a fluid tight seal therebetween.

2. A thermionic device comprising an electron-emitting element, an electrostatic control member and a surrounding anode, a peripherally complete flange of relatively thick metal provided on the anode and extending outwardly therefrom, a cover resting on said flange, and means including screws passing through the cover into said flange detachably securing said cover to each of the flange, said element and the control member, said means also providing a substantially fluid tight joint between the cover and the electrodes.

3. A thermionic device comprising an electron-emitting element, an electrostatic control member and a surrounding anode, a peripherally complete flange provided on the anode and extending outwardly therefrom, a cover resting on said flange, means for detachably securing said cover to each of the flange, said element and said control member, said means also providing a substantially fluid tight joint between the cover and the electrodes, a water jacket surrounding said anode, said jacket comprising a pair of concentrically arranged cylinders, the inner cylinder being spaced only a short distance from the anode and having its upper edge fall short of the flange of the anode in order to leave a space therebetween, the outer cylinder being provided with a flange member which abuts the anode flange, corrugations and recesses being provided on the abutting surfaces of the flanges, and means for detachably securing the flanges together to form a fluid tight joint.

4. A relatively low voltage, low vacuum thermionic device comprising a cylindrical anode closed at one end and having an outwardly extending metal flange of substantial thickness at the other end, corrugations on one side of said flange, a cover resting on the corrugated side of the flange and having recesses to receive said corrugations, screws passing through said cover and entering the flange detachably securing the cover to the flange, electron-emitting and electrostatic control electrodes contained within said anode, and means including nuts and screws which pass through the cover and are secured to the electron-emitting and control electrodes detachably securing said electrodes to the cover.

5. A fluid-cooled thermionic device comprising a cylindrical anode closed at one end and having an outwardly extending flange at the other end, a cover extending over said flange for closing the open end of the anode, cooperating electrodes contained within the anode, means for detachably securing said electrodes to the cover, a water jacket surrounding said anode, said jacket having an inwardly extending flange which is positioned directly below the anode flange and on which said anode flange rests, and means including screws extending through said cover and each of said flanges providing a gas tight seal between the cover and the anode flange, also a water tight seal between the anode flange and the flange on the jacket.

6. A water-cooled thermionic device comprising a hollow anode closed at one end and open at the other end, said anode being provided with an outwardly extending flange and a cover detachably secured to said flange, said cover closing the open end of the anode, a water jacket surrounding the anode, said jacket being provided with an inner positioned partition spaced only a relatively short distance away from the anode and leaving a space between the partition and the anode flange, the annular space between the anode and said partition adapted to receive water under pressure, the partition extending toward said anode flange but stopping short thereof in order to permit the water to move upwardly through said annular space and then over the edge of said partition and finally downwardly between the partition and the outer portion of the water jacket.

7. A thermionic device comprising an electron-emitting element, an electrostatic member and a surrounding anode, a circular flange provided on the anode and a cover resting on said flange, a water jacket surrounding said anode and having an inwardly extending flange which abuts the lower surface of said anode flange, both sides of said anode flange being corrugated and corresponding recesses being provided in the lower side of said cover and the upper side of said jacket flange and a layer of soft metal inserted between the cover, anode flange and jacket flange members in the region of said corrugations, and screw means passing through the cover and entering each of said flanges clamping said flanges and the cover together to provide a substantial hermetic seal between these elements.

8. A thermionic device comprising a cathode, a grid member and a surrounding anode, a circular flange provided on the anode and a cover resting on said flange, a water jacket surrounding the anode and having an inwardly extending flange on which the anode flange rests, means detachably securing said cathode and grid to said cover in a fluid-tight manner and including terminals extending to the exterior of the cover, a layer of soft metal interposed between the cover, the anode flange and the jacket flange, and screw means passing through the cover and entering each of said flanges detachably securing the cover and the flanges together to form a fluid-tight joint.

9. A thermionic device comprising a cathode, an electrostatic control member and a surrounding anode, a circular flange of substantial thickness provided on the anode and a cover resting on said flange to close the end of the anode and to serve as a support for the cathode and control member, terminal posts extending through said cover and connected to the cathode and control member, said posts being hermetically sealed to said cover, an evacuating pipe extending from the interior of said anode to the exterior of the cover and sealed to said cover, and means including screws passing through the cover into said anode flange detachably securing the cover to the anode flange to form a fluid-tight joint.

10. A thermionic device comprising a cathode, an electrostatic control member and a surrounding anode, a circular flange provided on the anode and a cover resting on said flange to close the end of the anode and comprising a support for the cathode and control member, terminal posts extending through said cover and connected to the cathode and control member, said posts being hermetically sealed to said cover by the material of the cover, an evacuating pipe extending from the interior of said anode to the exterior of the cover and sealed to said cover by the substance of which the cover is made, and means including screws passing through the cover into said anode flange securing the cover to the anode flange to form a fluid tight joint.

CHARLES R. STEVENS.

REFERENCES CITED

The following references are of record in the file of this patent:

UNITED STATES PATENTS

| Number | Name | Date |
|---|---|---|
| 1,353,976 | Stoekle | Sept. 28, 1920 |
| 1,660,381 | Holweck | Feb. 28, 1928 |
| 1,947,179 | Acheson | Feb. 13, 1934 |